(No Model.)

W. D. ORCUTT.
ROTARY CUTTER FOR TRIMMING BOOT AND SHOE HEELS.

No. 261,030. Patented July 11, 1882.

Witnesses:
Walter E. Lombard
E. A. Hemmenway

Inventor:
William D. Orcutt
by N. C. Lombard
Attorney.

UNITED STATES PATENT OFFICE.

WILLIAM D. ORCUTT, OF BOSTON, MASSACHUSETTS.

ROTARY CUTTER FOR TRIMMING BOOT AND SHOE HEELS.

SPECIFICATION forming part of Letters Patent No. 261,030, dated July 11, 1882.

Application filed April 7, 1882. (No model.)

*To all whom it may concern:*

Be it known that I, WILLIAM D. ORCUTT, of Boston, in the county of Suffolk and State of Massachusetts, have invented a new and useful Improvement in Rotary Cutters for Trimming Boot and Shoe Heels, of which the following, taken in connection with the accompany drawings, is a specification.

My invention relates to a rotary cutter for trimming the edges of boot and shoe heels, and is designed to obviate the necessity for using a jack to support the shoe while it is being trimmed, and at the same time render the cutter capable of being readily and easily sharpened; and it consists of a cutter made up of a series of disks or sections, each provided with a series of cutting blades or teeth arranged equidistant from each other around the periphery of said disk, and occupying a large proportion of the circumference of said disk, with the front or cutting edge of each tooth in a plane parallel to the axis of motion of the cutter, but in a different plane from that of the nearest tooth of the next or contiguous disk, said disks being fitted loosely upon the shaft or head which carries them, so that they may be clamped thereon by a suitable clamping-screw, with the several rows of teeth arranged spirally around the cutter, or so that their front edges may be in line and in planes parallel to the axis of said tool, the spiral arrangement of the teeth being used when the cutter is applied to trimming the edges of heels, and the straight or parallel position of the cutting-teeth being used when it is desired to sharpen said teeth, as will be more fully described.

Figure 1:
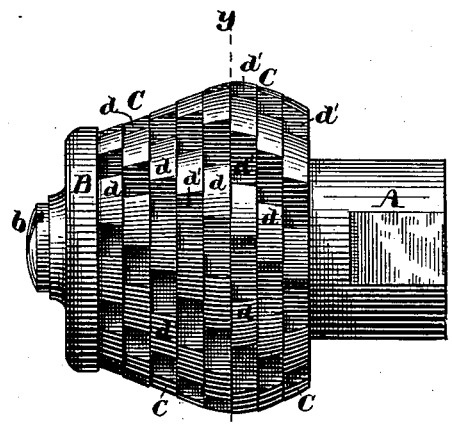
Figure 2:
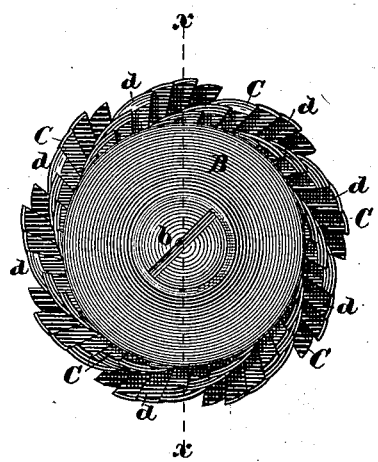
Figure 3:
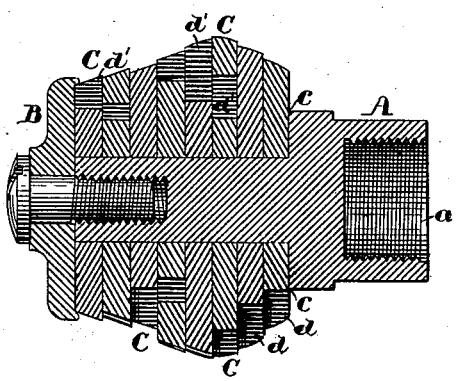
Figure 4:
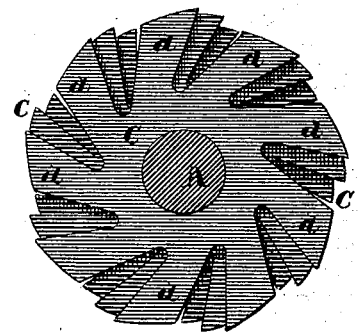

Figure 1 of the drawings is a side elevation of my improved cutter. Fig. 2 is an end view of the same. Fig. 3 is a longitudinal section on line *x x* on Fig. 2; and Fig. 4 is a transverse section on line *y y* on Fig. 1, looking toward the right.

A is the core or hub of the cutter-head, provided with a female threaded socket, *a*, in its large end, by means of which it is secured to its shaft or spindle, (not shown,) and in its opposite end with a threaded hole to receive the clamping-screw *b*, the head of which bears upon the outer surface of the disk B and clamps it and the several sections C C of the cutter between said head and the shoulder *c* of the core or hub A. The several sections C C of the cutter are each provided with a series of cutting-teeth, *d*, the front faces, *d'*, of which are in planes parallel to the axis of the cutter, as shown in the drawings. All of the sections are provided with an equal number of cutting-teeth of uniform shape and size, except as to length, said cutting-sections being formed in the following manner: A series of circular steel disks are first fitted upon a suitable mandrel and firmly clamped together, when their peripheries are turned to impart to the aggregate mass a longitudinal curve the reverse of the curve that it is desired to impart to the heel-edge. A series of channels are then cut longitudinally through the peripheries of said disks parallel to the axis of the mandrel, said channels or grooves being of such shape that one wall, *d'*, of each groove shall be slightly hooking or inclined to a radial plane, as shown in Fig. 4. The peripheral ends of the teeth are then "backed off" or cut away, so as to be eccentric to the axes of the disks, as shown in Figs. 2 and 4. The several disks C C are then removed from the mandrel and placed in the same order upon the core or hub A, and set and clamped thereon with the teeth of the several sections arranged spirally around said core, as shown in Figs. 1, 2, and 4.

I am aware that rotary cutters have been made in sections in the form of oblong bars or plates mounted upon and adjustable about a common core, and each section provided with a cutting-edge at each end; but it is obvious that such a cutter-head, having only two longitudinal rows of teeth, which are placed directly opposite to each other, whether placed in lines parallel with or spirally around the axis of said cutter-head, and having the stock between the said rows of teeth cut away to a depth equal to one-third or one-quarter of the radii of the cutting-teeth, would be of little or no practical value for use in trimming the edges of boot and shoe heels unsupported by a jack; for the reason that the heel would drop into the space between the two lines of teeth for lack of support, and when the projecting tooth came around again it would be very likely to take the shoe from the operator's hand and spoil the shoe, on account of the rank hold which the cutting-teeth would take upon the heel. This difficulty is entirely overcome by the use of my improved cutter by distributing the cutting-teeth all over the peripheral surface of the cutter-head—that is, forming a large number of cutting-teeth in each section, so that the spaces between the teeth shall not much, if any, exceed the circumferential width of the teeth, and then so setting said sections relative to each other that, whichever side of the cutter-head is turned toward the heel being trimmed, such a bearing-surface will be presented to the heel edge that no tooth can by any possibility take such a hold upon the material as to injure the shoe or pull it from the operator's hands.

When the cutting-teeth become so dulled as to require sharpening the several disks C C may be removed from the core A and placed in the same order upon a mandrel, similar to that upon which they were mounted when their teeth were cut, and are clamped thereto with the front edges of the teeth of the several disks in line longitudinally and in planes parallel to the axis of said mandrel; or they may be arranged and clamped in the same manner upon the core A, when by running a suitable grinding-wheel longitudinally through the groove, between two rows of teeth and in contact with the front radial, or nearly radial, face of one row, the teeth in said row will be readily sharpened without changing the shape of the peripheral end of either tooth of the set. By turning the cutter-head a distance equal to one tooth the next row of teeth may be sharpened, and so on to the end.

What I claim as new, and desire to secure by Letters Patent of the United States, is—

A rotary cutter-head for trimming the edges of boot and shoe heels, composed of a series of disks or sections each provided with a series of cutting-teeth evenly distributed about and occupying a large portion of the periphery of said disk, with their front radial, or nearly radial, faces in planes parallel to the axis of the cutter-head, and a common core upon which said disks are mounted and to which they may be clamped, with their teeth arranged in spiral rows around, or partially around, said head, or in straight longitudinal rows, substantially as and for the purposes described.

Executed at Boston, Massachusetts, this 5th day of April, A. D. 1882.

WILLIAM D. ORCUTT.

Witnesses:
E. A. HEMMENWAY,
WALTER E. LOMBARD.